Figure 1:
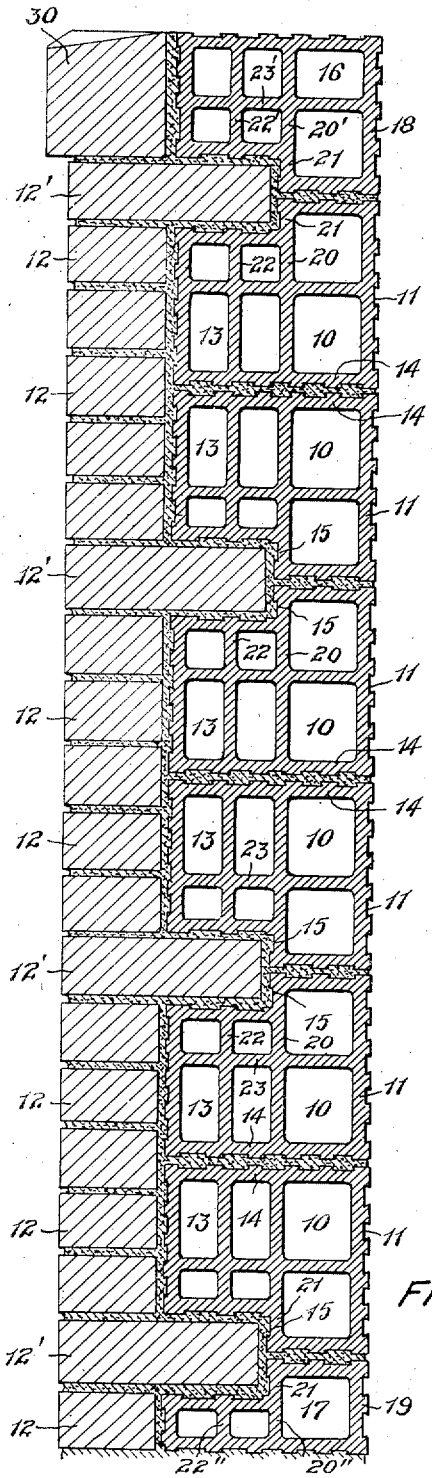

Nov. 20, 1928. J. EISENMANN Re. 17,137

BUILDING BLOCK AND CONSTRUCTION

Original Filed March 19, 1920

4 Sheets-Sheet 1

INVENTOR:
JOHN EISENMANN

BY Frease, Merkel and Taywell
ATTORNEYS

Nov. 20, 1928. J. EISENMANN Re. 17,137

BUILDING BLOCK AND CONSTRUCTION

Original Filed March 19, 1920 4 Sheets-Sheet 2

INVENTOR:
JOHN EISENMANN

BY
Frease, Merkel and Laywell
ATTORNEYS

Nov. 20, 1928. J. EISENMANN Re. 17,137

BUILDING BLOCK AND CONSTRUCTION

Original Filed March 19, 1920 4 Sheets-Sheet 3

INVENTOR:
JOHN EISENMANN

BY Frease, Merkel and Saywell
ATTORNEYS

Nov. 20, 1928. J. EISENMANN Re. 17,137

BUILDING BLOCK AND CONSTRUCTION

Original Filed March 19, 1920 4 Sheets-Sheet 4

INVENTOR:
JOHN EISENMANN

BY Frease, Merkel and Saywell
ATTORNEYS

Reissued Nov. 20, 1928. Re. 17,137

UNITED STATES PATENT OFFICE.

JOHN EISENMANN, DECEASED, LATE OF CLEVELAND, OHIO, BY THE MANELL BUILDING BLOCK & TILE COMPANY, ASSIGNEE, OF CLEVELAND, OHIO.

BUILDING BLOCK AND CONSTRUCTION.

Original No. 1,456,373, dated May 22, 1923. Serial No 367,064, filed March 19, 1920. Application for reissue filed September 29, 1928 Serial No. 309,281.

This invention relates to hollow blocks for use in building walls, and an object of the improvement is to provide a block of such dimensions, as compared with the dimensions of an ordinary building brick, that the block can be substituted for the same as a backing or inner lining or filling in a brick faced wall, so as to reduce the weight of the wall and at the same time form a better protection for the interior of the building against the action of the wind, frost, fire, water and other elements.

A more immediate object of the invention is to provide a block of such proportions that may be used to form a perfect bond, with locked and broken joints, in any common standard brick faced wall laid up in regular courses, and requiring a six course English bond.

The objects of the invention are attained by making a standard block with one bearing side formed in the same plane the full width of the block, and with a full height or depth on one side substantially equal to a certain number of courses, say three courses of ordinary building brick less one mortar joint and by forming a longitudinal offset in the other bearing side of the block, as deep as half the depth of one course of the brick.

The width of the block may be and usually is equal to the length of the ordinary brick, and the width of the offset may be and usually is equal to the width of a brick, plus the thickness of a normal mortar joint; thus making the width of the bearing face on the high side of the block equal to the width of an ordinary brick.

One or more auxiliary blocks may be used with the standard blocks for filling a double faced wall, and for starting the bases and for finishing the tops of all kinds of walls; each auxiliary block having a like offset in one bearing side and a like differential in the height or depth of the sides, one of the auxiliary blocks being preferably made with a maximum height of two and one half courses on its higher side, and another one being preferably made with a height of one and one-half courses on its higher side.

The standard and auxiliary blocks may also be made or broken to form stub blocks having a less width on the offset side, for use in building hollow walls and also for filling double faced walls of extra thickness.

Various embodiments of the invention, as used in the construction of walls having a six course English bond of ordinary brick, are illustrated in the accompanying drawings forming part hereof, in which:—

Figure 2:
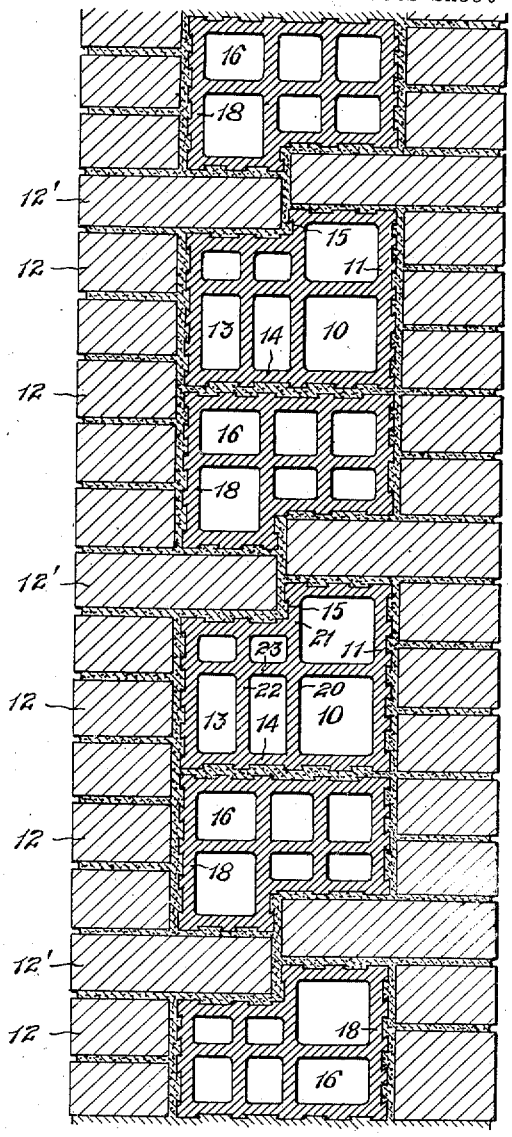
Figure 5:
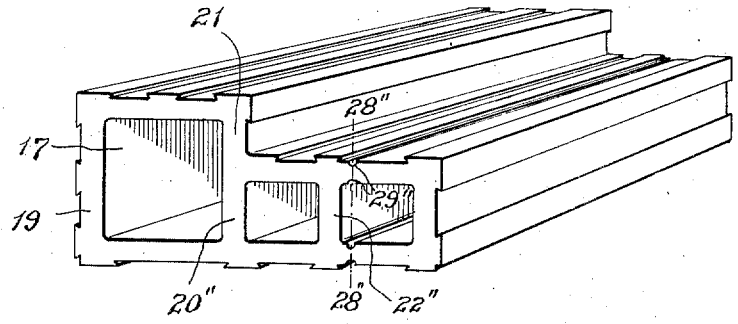
Figure 3:
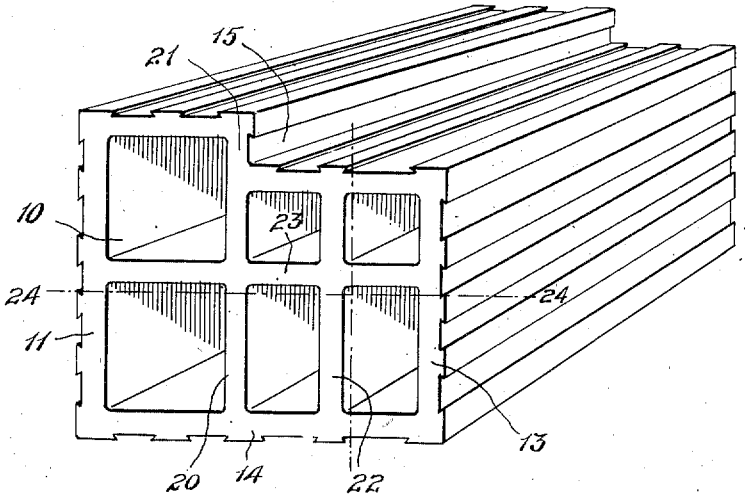
Figure 4:
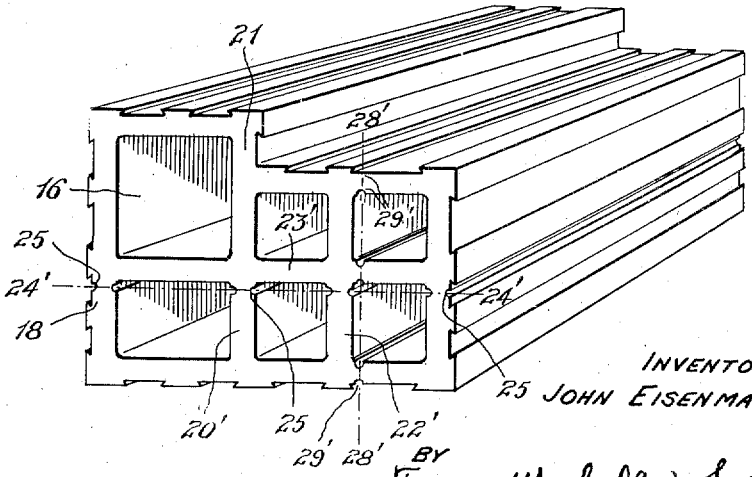
Figure 6:
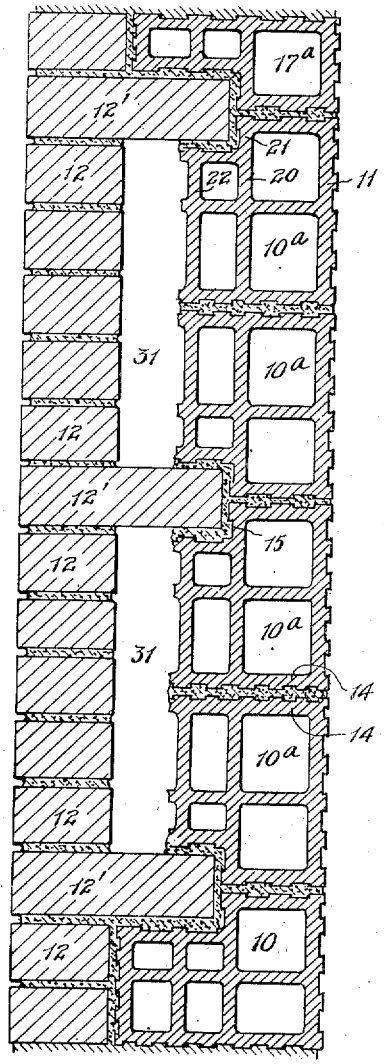
Figure 7:
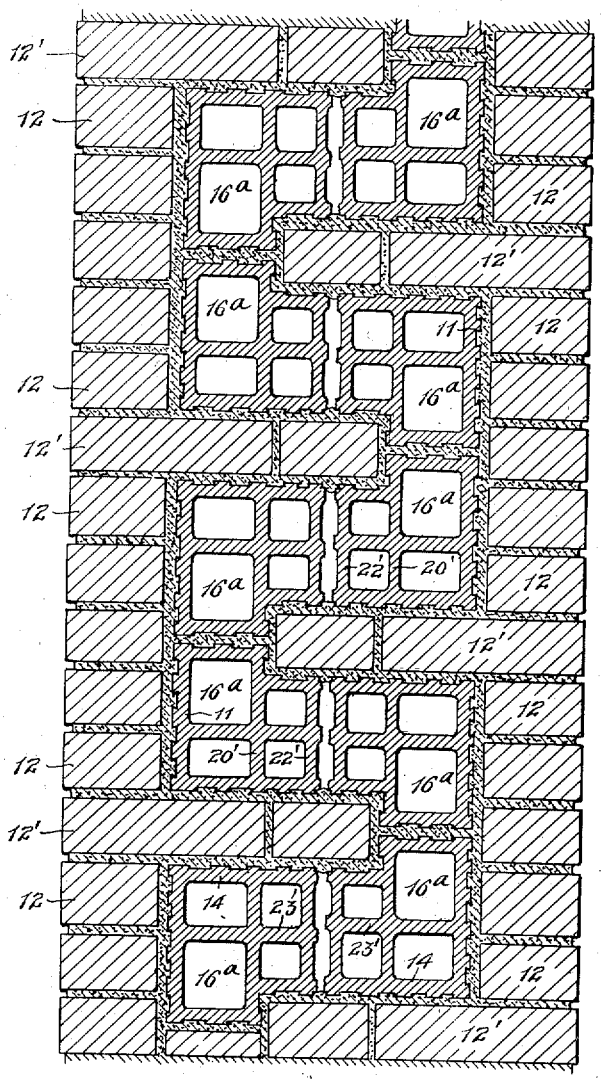
Figure 9:
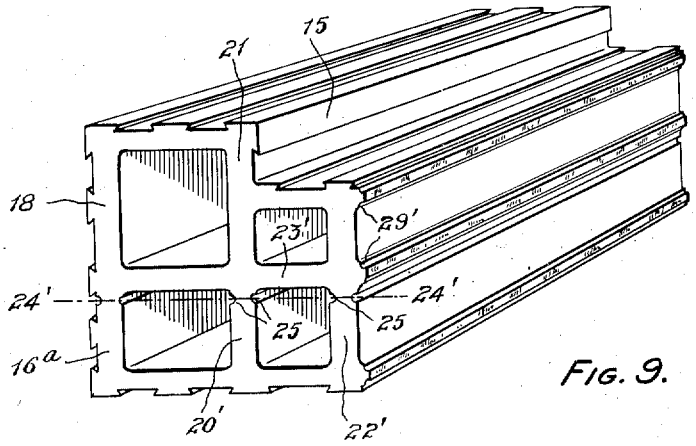
Figure 8:
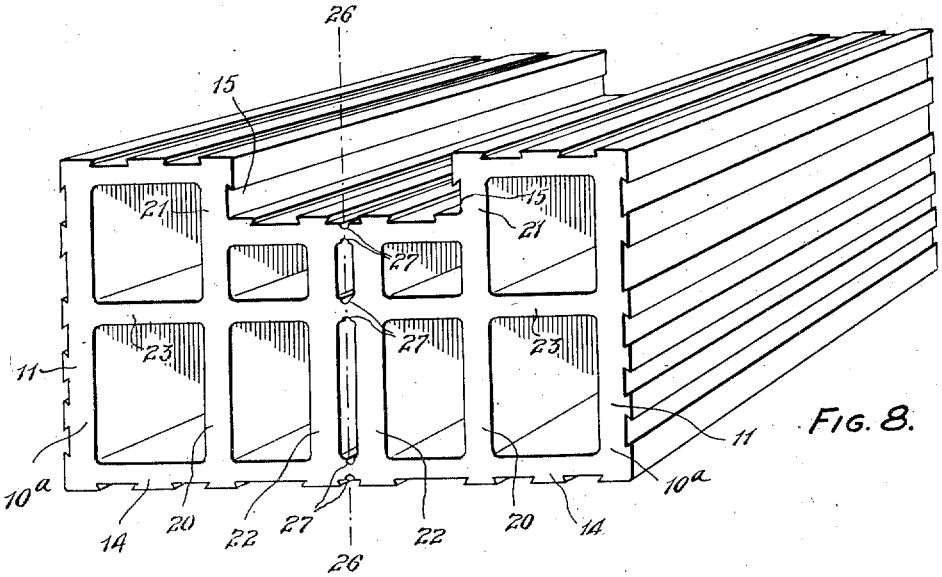

Figure 1 is a section of a brick faced, block backed wall, lined with three course standard blocks, showing the wall started with a one and one-half course auxiliary block and finished with a two and one half course auxiliary block;

Fig. 2, a section of a double faced brick wall with a filling made of three course standard blocks combined with two and one half course auxiliary blocks;

Fig. 3, a detached perspective view of a three course standard block;

Fig. 4, a like view of a two and one half course auxiliary block;

Fig. 5, a like view of a one and one-half course auxiliary block;

Fig. 6, a section of a brick faced, block backed wall, lined with three course standard stub blocks, showing the wall started with a two and one half course auxiliary block, and finished with a one and one half course auxiliary block;

Fig. 7, a section of a double faced brick wall of extra thickness, filled with two and one-half course auxiliary stub blocks;

Fig. 8, a perspective view showing the preferred method of making three course standard stub blocks, and Fig. 9, a like view of a two and one half course auxiliary stub block made by breaking off one side of a like auxiliary block.

Similar numerals refer to similar parts throughout the drawings.

Each standard block 10, is made with a height or depth on one side equal to three full courses of the ordinary brick 12, less one mortar joint; and the other side 13, being made with a height or depth equal to two and one half courses of the ordinary brick 12, less one mortar joint.

The width or thickness of the base or body 14 of the block is equal to the stretcher length of the ordinary brick 12′, and the depth of the offset 15 in the top of the block is equal to one half the depth of one course of the ordinary brick, including one mortar joint; the width of the offset at 15 which bonds with the header bricks being equal to the width of the ordinary brick, plus the thickness of a normal mortar joint.

The auxiliary blocks 16 and 17, are made with a height or depth on one side, 18 and 19 respectively, equal to two and one half and one and one half courses of ordinary brick, less the moieties of mortar joints above and below the blocks, and each auxiliary block is made with an offset in its upper side exactly like the offset in the standard block; so that all the blocks are made in accordance with the same plan or principle, the only difference being in the relative heights or depths of the different blocks; and all the blocks are preferably made with a length equal to one and one half stretcher lengths of ordinary brick or three full header courses thereof, plus the intervening mortar joints, so that they may be set on end in the building of a wall as may be desired.

The blocks are all preferably made with upright partition webs 20, 20′ and 20″, in line with the offset walls 21 in one of the bearing sides; and also with additional upright webs 22, 22′, 22″, which may be located substantially midway between the offset walls and the inner walls of the blocks.

The standard blocks and the larger auxiliary blocks are also provided with transverse partition webs 23 and 23′, which are preferably located just above the median line 24—24 of the higher side of the standard block 10, and at the same distance below the top of the auxiliary block 16; so that the auxiliary block 17 may be formed by breaking off the lower portion of either one of the larger blocks just below the transverse partition; thus again illustrating the fact that all the blocks are made alike in their offset portions, the depth of the lower portions being varied in accordance with the exigencies of use.

The smaller auxiliary blocks 17 may be formed in a brick machine, but are preferably made by breaking off the lower portion of the larger auxiliary blocks 16, on the line 24′—24′ just below the transverse partition 23′ thereof; and for that purpose the upright webs of the larger auxiliary blocks may be weakened by forming the grooves 25 in the plane of the line 24′—24′; as shown in Fig. 4.

The standard and auxiliary stub blocks may be formed in a brick machine, or may be made by breaking off the outer side of the ordinary blocks just inside of the upright partitions 22, 22′, and 22″ thereof, so as to reduce the width of the stub block to about three fourths the width of the ordinary blocks, as shown for the larger auxiliary block, in Fig. 9.

The standard stub blocks 10ᵃ are preferably formed double in a brick machine, as shown in Fig. 8, and may be wire cut on line 26—26 when emerging from the machine; or they may be broken apart on the same line after the double blocks have been dried and burned. The grooves 27 are preferably provided in the connecting partitions, to facilitate such a breaking of the double block.

And the auxiliary stub blocks as 16ᵃ, are preferably made by breaking off the outer side portion of the ordinary auxiliary blocks on lines 28′, 28″, as shown in Fig. 4 and Fig. 5; and for this purpose the grooves 29′ and 29″ are preferably provided in the plane of these lines for weakening the transverse webs of the blocks.

It is evident that by breaking the ordinary larger auxiliary blocks 16 as described, for making the smaller auxiliary blocks, and also the larger and smaller auxiliary stub blocks, it is only necessary to make and carry in stock the ordinary larger auxiliary blocks along with the double and single standard blocks; and that the standard blocks need never be broken for making the other forms of blocks.

In building an ordinary wall, the one and one half course auxiliary block 17 is used right side up when the wall is started with a single base stretcher course of ordinary brick 12, as shown in Fig. 1; and the two and one half course auxiliary block 16 is used when the wall is started with two stretcher courses of the ordinary brick 12, as shown in Fig. 2; and in each case the lower half of the first header row of the ordinary bricks 12′ extends into the offset portion of the auxiliary block as shown in both figures.

In a wall with a single face of ordinary brick as shown in Fig. 1, the five stretcher courses of the face brick are laid in the usual manner, and these courses are backed by two standard blocks, the lower one being inverted so that its offset portion bears upon the inner end of the first course of header bricks 12′ to make a bond therewith.

The same arrangement of blocks and bricks is continued upward until it is desired to form a finishing or a coping course, in which event a two and one half course auxiliary block 16 may be inverted with its offset portion upon one end of the last header course of the ordinary brick 12′, thus permitting the use of a sill 30 having the depth of two courses of bricks.

An ordinary wall having two faces of brick may be laid with an interior hollow block filling by combining a reversed and inverted auxiliary block 16, with a standard block 10, for filling the inside of each six courses of the ordinary face brick as shown in Fig. 2; and this arrangement may be duplicated until the top of the wall is reached. An extra thick double faced wall may be laid with an interior hollow block filling, by using the larger auxiliary stub blocks in successive normal, reversed and inverted arrangement, as shown in Fig. 7. Finally, an ordinary wall may be lined with standard stub blocks, to form hollow air spaces 31, between the face bricks and the backing blocks from one header course to another, as shown in Fig. 6.

In all these arrangements of the blocks, when used either for backing or for filling a brick faced wall, it is evident that the horizontal mortar joints are always broken; that is to say, the mortar joint between the bases of the superposed blocks are always located opposite the middle of the corresponding stretcher course of ordinary brick; and the mortar joint between the offset ends of the blocks always come opposite the middle of the corresponding header or bond course of the ordinary brick in the face of the wall; so that there is always a break in the horizontal mortar joint between the courses of the bricks and the courses of the blocks, and in no case is there a horizontal mortar joint extending continuously through the wall.

Claims:—

1. A backing or filling block for brick walls, said block having the full width of one bearing side formed in the same plane, and an offset in the other bearing side corresponding to half the depth of one course of the brick including one mortar joint.

2. A backing or filling block for brick walls, said block having the full width of one bearing side formed in the same plane, and an offset in the other bearing side corresponding to half the depth of one course of the brick, the full height of the blocks being substantially equal to the depth of a certain number of courses of the brick.

3. A backing or filling block for brick walls, said block having the full width of one bearing side formed in the same plane, and an offset in the other bearing side corresponding to half the depth of one course of the brick, the full height of the block being equal to the depth of three full courses of the brick less one mortar joint.

4. A backing or filling block for brick walls, said block having the full width of one bearing side formed in the same plane, and an offset in the other bearing side corresponding to half the depth of one course of the brick, the width of the bearing on the higher side of the block being equal to the width of a brick.

5. A backing or filling block for brick walls, said block having the full width of one bearing side formed in the same plane and an offset in the other bearing side corresponding to half the depth of one course of the brick, the width of the offset being equal to the width of the brick plus a normal mortar joint.

6. A backing or filling block for brick walls, said block having the full width of one bearing side formed in the same plane, and an offset in the other bearing side corresponding to half the depth of one course of the brick, the width of the block corresponding to the stretcher length of a brick and the width of the offset being the width of the brick plus the thickness of a vertical mortar joint.

7. Wall construction comprising a face of bricks laid with single header courses between a plurality of stretcher courses, and a backing of blocks having one bearing side flat and an offset in the other bearing side corresponding to half the height of one course of the brick, the offsets forming a bond with the inner ends of the bricks in the header courses.

8. Wall construction comprising a face of bricks laid with single header courses between five stretcher courses, and a backing of blocks each of which with one mortar joint is three brick courses high, and each block having one bearing side flat and an offset in the other bearing side corresponding to half the height of one course of the brick, the offsets forming a bond with the inner ends of the bricks in the header courses.

9. Wall construction comprising a face of bricks laid with single header courses between a plurality of stretcher courses, and a backing of blocks having one bearing side flat and an offset in the other bearing side corresponding to half the height of one course of the brick, the offsets forming a bond with the inner ends of the bricks in the header courses, the blocks being arranged in pairs of which one block is generally above and the other generally below each header course.

10. Wall construction comprising a face of bricks laid with single header courses between a plurality of stretcher courses, and a backing of blocks having one bearing side flat and an offset in the other bearing side corresponding to half the height of one course of the brick, the offsets forming a bond with the inner ends of the bricks in the header courses, the blocks being arranged in pairs of which one block is generally above and the other generally below each header course, the blocks of a pair abutting along a horizontal mortar joint which substantially bisects the header course, and each pair of blocks being bonded to like pairs above and below along horizontal mortar joints which substantially bisect the stretcher course of bricks which is midway between header courses.

11. A wall construction comprising a brick facing part arranged with a plurality of stretcher courses between header courses and a hollow tile back-up part into which the inner ends of the bricks in the header course extend, said hollow tile back-up part being formed of like blocks each having one horizontal surface formed with a step portion equal in depth to half the height of a course of brick including one mortar joint, the tile blocks in the wall being arranged in pairs with the blocks of each pair in juxtaposition with the stepped portions of the pairs of blocks bonding the upper and lower surfaces of the inner ends of the header bricks in a given header course, each pair of blocks being disposed between like pairs above and below which pairs in turn bond between them the inner ends of header bricks in a similar manner, the said pairs bearing upon each other with horizontal mortar beds in one plane between pairs of blocks, which planes substantially bisect a stretcher course of brick, the vertical displacement of each pair of blocks including the mortar joint opposite the header course being equal to the sum of the thicknesses of one more than the number of bricks in the stretcher courses between adjacent header courses plus as many mortar joints less one.

12. A composite brick and hollow tile wall comprising a hollow tile part and a brick facing part including courses of header brick extending into the tile part and five courses of stretcher brick laid between adjacent header courses and disposed without the tile part, said hollow tile part comprising blocks all shaped alike and each having horizontal bearing portions formed with an offset equal to half the height of one course of brick and each block having a maximum height equal to the thickness of three brick plus two mortar joints, said blocks being arranged in vertically disposed pairs with the offset bearing portions of adjacent blocks facing each other and bonding the upper and lower faces of the inner ends of the header brick between them and having between them a mortar joint opposite the header bricks, each pair of tile blocks being disposed between like pairs above and below and bearing along mortar joints in the same horizontal plane, which pairs of blocks in turn have bonded between them the inner ends of the next adjacent header courses of brick, the vertical height of each pair of blocks plus the mortar joint opposite the header bricks being equal to the thickness of six brick plus five mortar joints, every header course in the wall being bonded between separate and distinct pairs of blocks and every separate pair of blocks embracing a distinct header course of brick.

THE MANELL BUILDING
BLOCK & TILE COMPANY,
*Assignor of John Eisenmann, Deceased,*
By RALPH W. EDWARDS,
*Vice-President.*